United States Patent [19]

Winkler

[11] 4,318,532
[45] Mar. 9, 1982

[54] HIGH VACUUM VALVE HAVING A METAL-TO-METAL SEALING JOINT

[75] Inventor: Otto Winkler, Balzers, Liechtenstein

[73] Assignee: Balzers Aktiengesellschaft, Liechtenstein

[21] Appl. No.: 115,730

[22] Filed: Jan. 28, 1980

[30] Foreign Application Priority Data

Feb. 1, 1979 [CH] Switzerland ............................ 965/79

[51] Int. Cl.$^3$ ............................................... F16K 1/34
[52] U.S. Cl. ...................................... 251/334; 251/333
[58] Field of Search ................................. 251/334, 333

[56] References Cited

U.S. PATENT DOCUMENTS

| 1,800,127 | 4/1931 | Wilson | 251/334 |
| 1,847,385 | 3/1932 | Dengler | 251/334 X |
| 2,765,983 | 10/1956 | Mayo | 251/333 X |
| 3,185,438 | 5/1965 | Smirra | 251/334 |
| 3,430,613 | 3/1969 | Barnes | 251/368 X |
| 3,817,450 | 6/1974 | Mischke | 251/333 X |
| 4,136,854 | 1/1979 | Ehmig et al. | 251/368 X |

*Primary Examiner*—Arnold Rosenthal
*Attorney, Agent, or Firm*—McGlew and Tuttle

[57] ABSTRACT

In metal-to-metal sealed high vacuum valves, a parallel motion of the sealing faces relative to each other is to be prevented, to avoid damaging of the faces during their mutual contact. This is obtained by means of a cup spring type shutoff member having a sealing face on its periphery, cooperating with the inner edge of a second conically shaped annular spring element as the opposite sealing face. The flexural stiffnesses and lever arm lengths in the radial direction of the two spring elements are to be approximately equal to each other. To ensure that the spring elements can perform their motion only in the direction of normals to the sealing faces, a guide cone having an engaging portion is advantageously provided.

17 Claims, 6 Drawing Figures

HIGH VACUUM VALVE HAVING A METAL-TO-METAL SEALING JOINT

FIELD AND BACKGROUND OF THE INVENTION

The invention relates in general to valves and in particular to a new and useful metal-to-metal sealing mechanism for a vacuum valve, in which two concentric conically shaped spring elements cooperate with each other.

High vacuum valves with a metal-to-metal joint and cup-shaped stop members are known. In the prior art, preferably a relatively hard edge has been combined with a softer sealing mate. An example is shown in U.S. Pat. No. 3,108,780. With such a design, to ensure sealing after repeated shutoffs, the sealing force must slightly be increased upon every shutoff, i.e. the cup spring having the sealing edge on its periphery must recurrently be more and more expanded. This may be done up to a certain limit at which the softer sealing mate must be exchanged or, as disclosed in the above cited U.S. patent, the sealing edge must be displaced to reach a virgin sealing face portion.

High vacuum valves with a cup-shaped shutoff member such as disclosed in German OS Nos. 26 23 906 and 25 23 152, are an attempt to bypass this disadvantage by providing only relatively hard sealing mates and using a conical sealing seat at the same time as a stop. This design assumes that the cup spring, which is secured to an axially displaceable stem, becomes automatically centered by its rim in the conical sealing mate which, preferably, forms a part of the valve housing, and that in the course of further displacement of the stem with a contact on all sides and due to the expansion, the two sealing mates undergo a substantially elastic deformation, so that the sealing faces are not deformed permanently.

However, only with a highly accurate concentricity of the cup spring and the cone it may be expected that aside from a rolling motion, no further relative motion occurs on the sealing faces, particularly not parallel thereto, which would cause an alteration of the faces. In fact, already at the first shutoff operation, permanent deformations in the provided cooperating materials and a parallel relative motion of the sealing faces are to be taken into account. Primarily, the microgrooves resulting from the machining and other irregularities of surface texture are compensated for during the axial displacement, in a process of conformation.

This motion parallel to the sealing faces will cease only with the frictional forces exceeding the thrust. Only then starts the expansion of the cup spring leading to a further plastic deformation until the conformation of the surfaces reaches a degree at which the contact area is sufficiently large to absorb a further increase of the contact pressure elastically.

The expected mechanism of the sealing process at the rim of the cup spring in a prior art valve having a conical seat such as shown in FIG. 1, is illustrated in FIG. 2. FIG. 2 is a greatly enlarged partial view of the sealing zone in which cup spring 1 and conical surface 2 of FIG. 1 contact each other. In this illustration, it has been assumed that the cup spring and conical seat are made of high-grade, for example, stainless steel.

The dotted outlines 3 and 4 in FIG. 2 show the valve seat geometry in a valve which has already once been closed, at an instant shortly prior to the start of the expansion. The solid line contours 5 and 6 correspond to the state under full load. At 7 and 8, the vector of the closing force and the vector of the contact pressure at the circumference of the spring cup, respectively, are shown. The axial displacement during this process corresponds to the distance from point 9 to point 10. This displacement necessarily entails a damaging of the sealing faces, affecting their sealing function.

If harder sealing mates are selected, of the quality of a hardened ball-bearing steel, and an attempt is made to prevent the contact pressure action by a perfect surface geometry and mirror finish, the problem arises that soiling matter is only crushed on the surface and no longer embedded into the sealing material, whereby the sealing effect becomes problematic again.

The conditions are more favorable if the conical seat is made of a harder material, for example, stellite, and the spring cup of a relatively softer material, since then only the spring cup undergoes a plastic deformation. The manufacture of such a valve, however, is very expensive and even in this case, a sliding motion must be expected at least in some places at the circumference until the contact is established along the entire circumference, for example, if foreign matter is present on the surface, and also because a perfect roundness of the conical surface and the cup spring cannot be achieved.

SUMMARY OF THE INVENTION

The present invention is directed to a high vacuum valve comprising a cup-spring-shaped shutoff member and designed in such a way that during the closing motion the two sealing faces move against each other in the direction of the normals thereto.

In accordance with the invention, a high vacuum valve comprises a valve housing with an annular spring member mounted in the housing which has a central opening and a peripheral sealing edge around the opening. A valve member is movably mounted in the housing and it advantageously comprises a stem having a lower end to which is secured an annular spring member. The annular spring member has an inner periphery secured to the stem and an outer periphery defining a stop portion which is engageable with the valve seat which is defined by the portion of the spring member bounding the opening of the spring member. Each of the spring member and the valve member have a conically shaped form and are concentrically arranged.

The effect of this solution is that after the two sealing faces come into contact with each other, they only perform a relative motion in the direction of the contact pressure. Any displacement parallel to each other of the contacting sealing faces and also rolling motions are avoided. The expensive sealing surfaces are thereby protected during service and their life is substantially extended.

Since the spring elements engage with each other, they flex in exact synchronism. This solution further makes it possible to employ relatively soft sealing mates, permitting a secure sealing even with a soiled valved seat.

Accordingly it is an object of the invention to provide a high vacuum sealing valve which comprises a valve housing, an annular spring member mounted in the housing and having a central opening in the peripheral sealing edge which defines a valve seat bounding the opening, a valve member movably mounted in the housing for movement toward and away from the opening, and an annular spring valve member having an inner periphery secured to the valve member and an outer periphery defining a stop portion engageable with the valve seat to close the opening, each of the valve members and spring member being conically shaped and concentrically arranged.

A further object of the invention is to provide a high vacuum valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
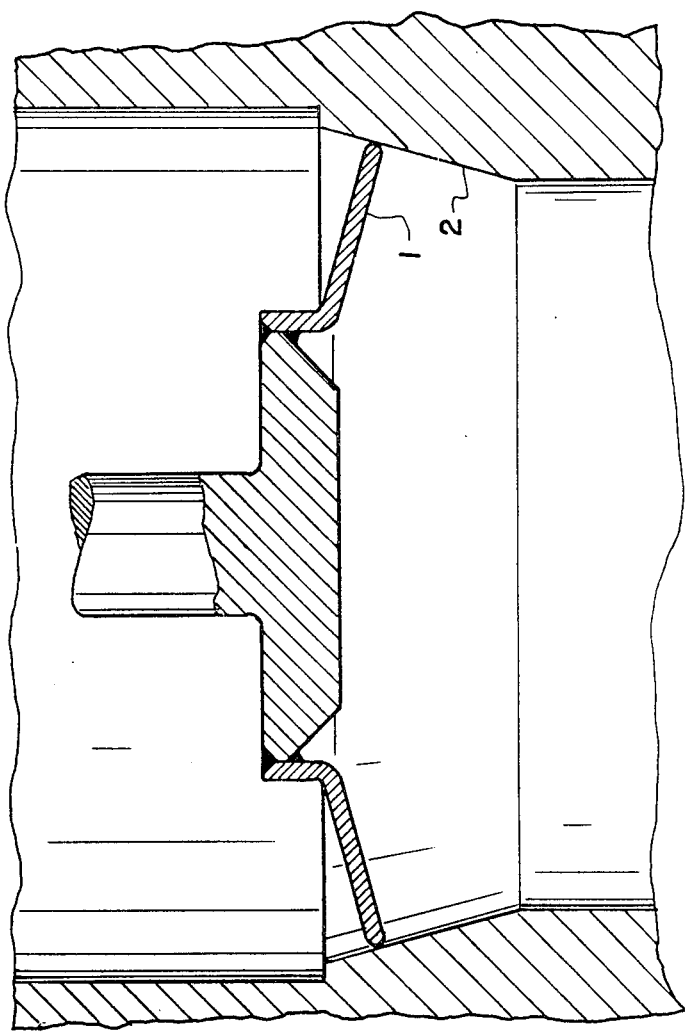
FIG. 1 is an enlarged partial sectional view showing the valve construction of the prior art.
Figure 2:
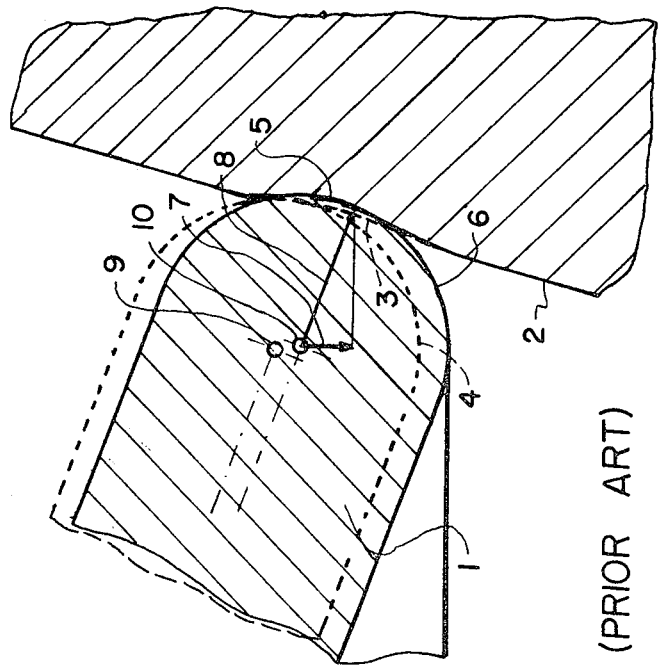
FIG. 2 is an enlarged view of the valve shown in FIG. 1 showing the interaction of the parts during a sealing operation of the prior art.
Figure 3:
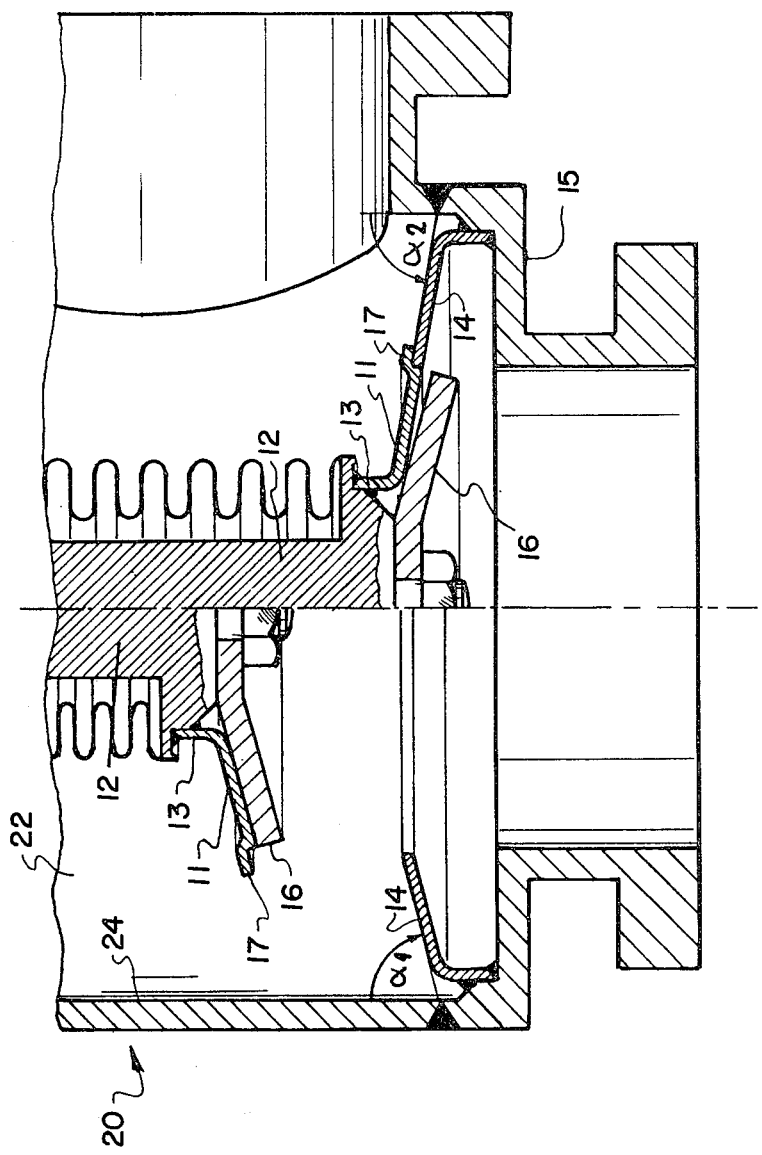
FIG. 3 is a partial sectional view of a valve constructed in accordance with the invention.
Figure 4:
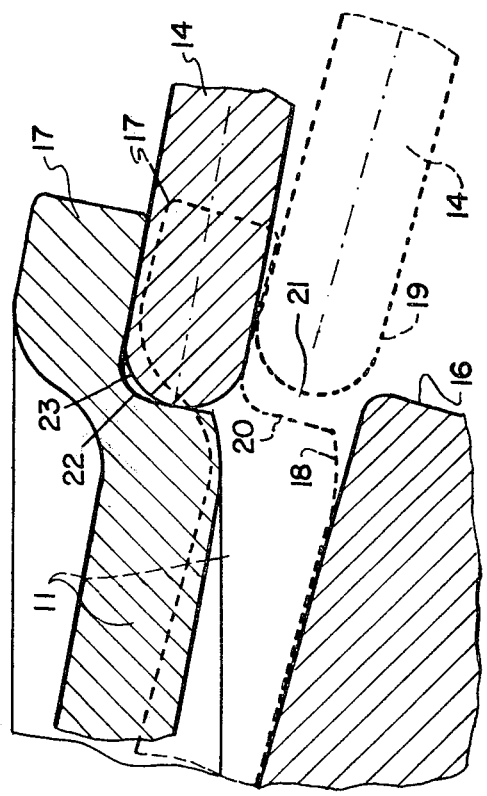
FIG. 4 is a view on a greatly enlarged scale showing the interaction of the valve and seat parts of the construction shown in FIG. 3.

Referring to the drawings in particular, the invention embodied therein in FIGS. 3 and 4 comprises a valve generally designated 20 which is advantageously employed in situations requiring a high vacuum and it includes a valve housing 22 which has an interior substantially vertical wall 24. An annular spring member 14 has an outer periphery welded to the valve housing at the location of the wall 24 and it includes a conical portion with an inner opening and a peripheral sealing edge which defines a valve seat which bounds the opening. A valve member such as a valve stem 12 is mounted in the housing for movement toward and away from the opening and in accordance with the invention an annular spring valve member 11 has an inner periphery secured to the stem 12 and an outer periphery which defines a stop portion 17 which is engageable with the valve seat to close the opening. Each of the valve member 12 and the spring member 14 have conically extending portions which are concentrically arranged in respect to each other.

FIG. 3 is a sectional view of the inventive valve, shown in an open position on the left side of the center line and a closed position on the right side o the center line. A spring cup 11 has a collar portion 13 which is welded to a displaceable stem 12 in order to keep the spring temper within the elastically stressed range. A mating spring 14 is welded to a valve housing 15 in a similar manner. Its stiffness about equals that of the cup spring 11.

To avoid high requirements on the precision of guidance, a guide cone 16 is advantageously provided, which is made of a soft material such as aluminum or a temperature resistant plastic, for example, of a fluorcarbon compound.

Cup spring 11 is formed with a stop portion 17 acting as an engaging member for spring 14. During the closing operation, angle alpha 1 ($\alpha_1$) changes to alpha 2 ($\alpha_1$). This makes the sealing faces on the periphery of both spring elements approach each other. As shown in FIGS. 3 and 4, the stop portion 17 includes a sealing face extending substantially normal to the generatrix defining the conical shape of the spring cup 11.

This phase is shown in the enlarged view of FIG. 4. The dotted outlines 18, 19 of cup spring 11 and spring 14 show their position at the instant at which stop portion 17 just contacts spring 14. The sealing faces 20, 21 are still spaced from each other. Only upon a further displacement of stem 12 (FIG. 3), due to the flexure of the two springs, the sealing faces come into a position corresponding to the solid contour lines 22, 23. In this position, cup spring 11 is lifted from guide cone 16.

This synchronized motion ensures that, as mentioned above, during the closing operation of the valve, the sealing faces move exactly in the direction of normals thereto and any mutual displacement parallel to the sealing joint is avoided. In this way, an almost ideal contact pressure establishing operation is performed.

Figure 5:
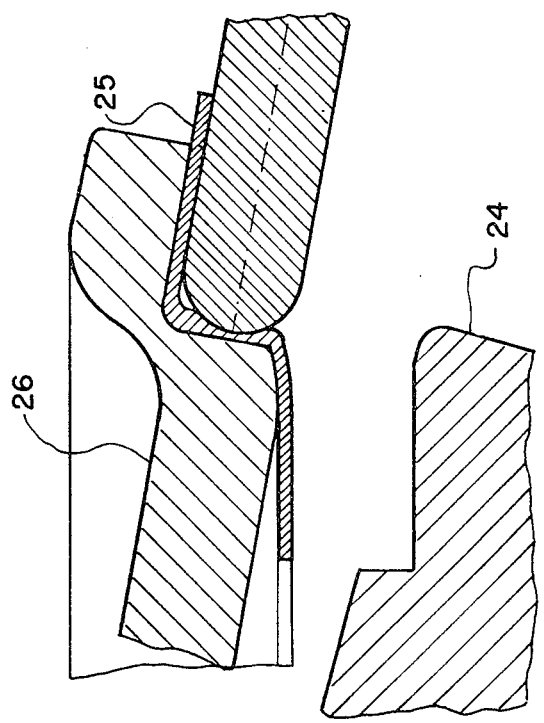
FIG. 5 is a view similar to FIG. 4 of another embodiment of the invention.

Again mating of hard and soft material may be provided. FIG. 5 shows a possibility in a partial view of the sealing area about 10 times enlarged. A guide cone 24 is shaped to receive an about 0.2 mm thick washer 25 of a soft material, such as copper or aluminum, whose section is conformed to that of the rim of a cup spring 26. Such washer may be easily exchanged upon unscrewing the guide cone, as soon as its deformation becomes extensive.

The inventive valve design has a further important advantage that prior to closing, the clearance between the sealing faces is twice the face space in a valve where the cup spring moves against a fixed wall, for example, against the valve housing. The risk of a premature contact and damaging of the sealing faces prior to the closing proper is thereby reduced. This is particularly important in valves of small diameter where the spacing of the sealing faces from each other at the periphery is correspondingly small.

To prevent the sealing mates from being cold-welded to each other (diffusion) it is advantageous to coat at least one sealing mate with a hard substance having little tendency to diffusion. It is sufficient to provide a layer thickness of less than one micron, for example, of titanium nitride, preferably applied in a process in which the spring material is not to be thermally stressed, for example, by ion plating, so that the coat is at the same time firmly anchored to the substrate.

Figure 6:
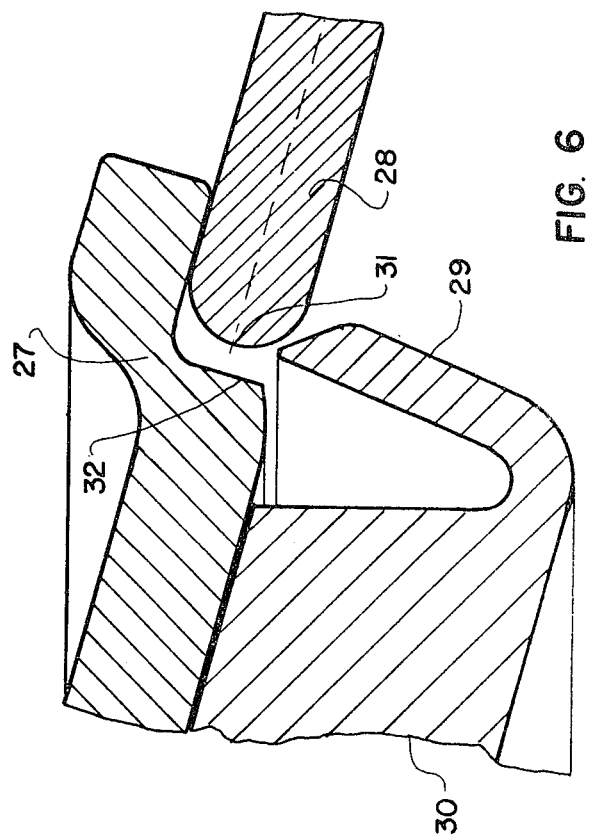
FIG. 6 is a view similar to FIG. 4 of still another embodiment of the invention.

An additional possibility for forestalling the tendency to diffusion is to make the guide cone 16 in FIG. 3 of a temperature resistant plastic having a low vapor pressure, for example, a fluorcarbon compound, and, as shown in the embodiment of FIG. 6, to provide cone 30 with a resilient lip 29 having an outer diameter slightly exceeding the inner diameter of a spring element 28. While closing the valve, the resilient lip 29 comes into intimate contact with the sealing face of spring element 28 moving past the lip so that a thin lubricating film is applied to the sealing face reducing the tendency of the latter to weld.

FIG. 6 shows the valve sealing mechanism in a position immediately before the spring elements 27 and 28 start to flex. As shown, the lip 29 of guide cone 30 has an outer diameter exceeding the inner diameter of spring element 28. During the closing motion, the sealing face of element 28 is lubricated by the plastic of the lip 29 and a welding to the opposite face 32 is prevented.

Not only temperature resistant plastics, but also plastics which are subsequently impregnated with a solid lubricant, such as molybdenum disulfide may be employed.

While specific embodiments of the invention have been shown and described in detail to illustrate the application of the principles of the invention, it will be understood that the invention may be embodied otherwise without departing from such principles.

What is claimed is:

1. A high vacuum valve, comprising a valve housing, an annular spring member mounted in said housing having an outer peripheral portion secured to said housing and a central opening and a peripheral inner sealing edge face bounding the opening and defining a valve seat about said sealing edge face, a valve member movably mounted in said housing for movement toward and away from said central opening, an annular spring cup having an inner periphery secured to said valve member and an outer periphery defining a stop portion engageable with said valve seat to close said central opening, each of said spring cup and said spring member being conically shaped and concentrically arranged in respect to each other, said stop portion including a sealing face extending substantially normal to the generatrix defining the conical shape of said spring cup, and means for radially displacing one of said sealing face and said sealing edge face into sealing engagement with each other.

2. A high vacuum valve according to claim 1, wherein each of said annular spring member and said annular spring cup each comprises a material imparting substantially the same flexural stiffness and each having a radial extent which are substantially equal to each other.

3. A high vacuum valve according to claim 1, wherein said annular spring member and said annular spring member each comprise very high temperature resistant spring-hard material of high strength.

4. A high vacuum valve according to claim 1, wherein said valve seat and said stop portion are coated with a hard material having a little tendency to weld.

5. A high vacuum valve according to claim 1, wherein said valve member comprises a valve stem having a flattened bottom, a guide cone member secured to said flattened bottom of said stem and having a portion overlying said spring cup.

6. A high vacuum valve according to claim 5, wherein said spring valve member stop portion includes an off-set edge engageable over the said valve seat of said spring member.

7. A high vacuum valve according to claim 1, wherein said valve member includes said radial displacement means, said radial displacement means including an offset edge at the outer periphery of said spring cup adapted to engage said valve seat, said radial displacement means being responsive to a further displacement of said valve member after engagement of the offset edge to said annular spring member.

8. A high vacuum valve according to claim 1 or 7, wherein said radial displacement means is operable to radially displace both of said sealing face and said sealing edge face.

9. A high vacuum valve according to claim 8, wherein said sealing face and said sealing edge face are displaceable by said radial displacement means toward each other in a direction substantially normal to each respective face.

10. A high vacuum valve, comprising a valve housing, an annular spring member mounted in said housing having a peripheral portion secured to said housing and a central opening and a peripheral inner sealing edge bounding the opening defining a valve seat, a valve member movably mounted in said housing for movement toward and away from the opening, and an annular spring valve member having an inner periphery secured to said valve member and an outer periphery defining a stop portion engageable with said valve seat to close the opening, each of said spring valve member and said spring member being conically shaped and concentrically arranged in respect to each other, wherein said valve member comprises a valve stem having a flattened bottom, a guide cone member secured to said flattened bottom of said stem and having a portion underlying said spring valve member, and wherein said spring valve member stop portion includes an off-set edge engageable over the said spring member and said valve seat.

11. A high vacuum valve according to claim 1, wherein said valve seat and said stop portion define sealing spaces, one of said spaces being covered with a thin sheet of soft metal.

12. A high vacuum valve according to claim 1, including a guide cone connected to said valve member between said annular spring member and said spring cup.

13. A high vacuum valve according to claim 12, wherein said guide cone is made of a temperature resistant plastic having a low vapor pressure.

14. A high vacuum valve according to claim 13, wherein said stop portion comprises a resilient lip having a diameter larger than said valve seat.

15. A high vacuum valve according to claim 5, wherein said guide cone comprises a soft metal material extending radially outwardly of said valve member and being interposed between said stop portion and said valve seat.

16. A high vacuum valve according to claim 1, wherein said guide cone includes an outer flexible lip portion of a diameter large enough so as to be contacted by said valve member during flexure of said valve member by engagement thereof with said valve seat.

17. A high vacuum valve according to claim 16, wherein said lip portion has a material thereon providing a lubrication for said valve seat.

* * * * *